Dec. 12, 1967     K. B. THOMPSON     3,357,769
OPTICAL VIEWING APPARATUS Filed Feb. 9, 1965     4 Sheets-Sheet 1

INVENTOR.
KENNETH B. THOMPSON
BY Forrest J. Lilly
ATTORNEY

Dec. 12, 1967 K. B. THOMPSON 3,357,769
OPTICAL VIEWING APPARATUS
Filed Feb. 9, 1965 4 Sheets-Sheet 3

INVENTOR.
KENNETH B. THOMPSON
BY Forrest J. Lilly
ATTORNEY

INVENTOR.
KENNETH B. THOMPSON
BY Forrest J. Lilly
ATTORNEY

United States Patent Office 3,357,769
Patented Dec. 12, 1967

3,357,769
OPTICAL VIEWING APPARATUS
Kenneth B. Thompson, Lake Hughes, Calif.
(P.O. Box 4, Leona Valley, Calif. 93550)
Filed Feb. 9, 1965, Ser. No. 431,348
10 Claims. (Cl. 350—121)

ABSTRACT OF THE DISCLOSURE

A wide angle viewing device suitable for use as either a camera lucida or a slide viewer. A positive lens is positioned with its optical axis coincident with the optical axis of a concave spherical mirror, the lens having a curved field substantially matching the curved field of the mirror. The lens produces a real image substantially coincident with the principal focal surface of the mirror. A partially reflecting, partially transmitting beamsplitter also intersects this principal focal surface of the mirror. Means for supporting and illuminating a slide are included where use as a slide viewer is intended.

---

This invention relates generally to optical viewing devices and, more particularly, to new and improved optical viewing apparatus having an extremely wide visual field and characterized by unusually low distortion and curvature of field with essentially complete freedom from off-axis aberrations.

The invention finds particularly advantageous application as a film transparent viewer, as a camera lucida, i.e., a device for simultaneously viewing a virtual image of a subject being sketched and an easel surface onto which the subject's likeness is to be transferred, and as a device capable of selective utilization as either a slide viewer or a camera lucida. For this reason, the invention is described with particular emphasis upon these applications. However, it is to be understood that the specific embodiments set forth in the ensuing description are by way of example only and are not to be considered as restricting the invention.

Camera lucidas have long been used by artists and others to simultaneously view a virtual image of a subject being sketched or painted and the easel, canvas or copyboard upon which the subject's likeness is to be reproduced. While a wide variety of camera lucida devices have been developed for this purpose, varying in complexity from simple mirror arrangements to elaborate and expensive optical systems, none of these devices have proven entirely satisfactory.

One of the most critical problems confronting designers of such camera lucidas has been the restricted field of view of the subject observed through the lucida instrument. Another serious problem encountered with such devices is parallax, i.e., the inability to precisely align the plane of the virtual image observed by the viewer with the plane of the easel surface.

While one approach to the elimination of parallax has been to introduce lenses into the system to vary the location of the virtual image plane, such systems have generally proven unsatisfactory because of the enlargement or reduction in the size of the virtual image. Moreover, due to curvature of field, parallax correction generally cannot be simultaneously effected over the entire field of view, since the curved virtual image can only, at best, be partly in and partly out of registration with the planar surface of an easel or the like. In other words, a curved surface and a plane can never be brought into precise coincidence. As a result, the virtual image shifts laterally as the eye of the observer is moved slightly from its original position in the course of tracing the subject's likeness upon the easel. This is referred to in the optical art as "parallactic image shift."

Another commonly encountered problem with camera lucida devices has been the presence of distortion and a relatively high degree of off-axis aberrations such as coma and astigmatism. In view of the relatively high cost of low distortion, relatively aberration-free optics, attempts to economically overcome these difficulties have generally been unsuccessful.

Film transparency viewers have usually suffered from a number of similar difficulties, e.g., restricted field of view, distortion and curvature of field. In addition, it is well known in the photographic arts that, in order to observe a picture in its true perspective, the picture must be viewed with a lens having a focal length which closely matches the focal length of the original camera lens used to take the picture. Generally, this condition is not realized in typical slide viewers because of the unusually large and expensive lenses which would be required. In most slide viewers, the focal length of the viewer lens is considerably longer than the focal length of the original camera lens to reduce the field angle and, hence, minimize distortion in a relatively economical manner. However, while this does effect a savings in cost, it inherently renders the system incapable of providing the viewer with an image presenting the scene observed in its true perspective.

Hence, those concerned with the development of wide angle optical viewing devices have long recognized the need for new and improved apparatus which overcomes the above and other disadvantages of the prior art. The present invention fulfills this need.

Accordingly, an object of the present invention is the provision of new and improved optical viewing apparatus having a wide field of view, low distortion, and wherein curvature of field and aberrations are minimal.

Another object is to provide a new and improved wide angle optical viewing device of relatively simple and economical construction.

A further object of the invention is the provision of a new and improved wide angle optical viewing device which is relatively free from coma, astigmatism, distortion and curvature of field, and yet is relatively compact and lightweight.

Still another object is to provide a new and improved camera lucida apparatus characterized by a wide field of view, low distortion, and minimal curvature of field and off-axis aberrations.

Yet another object of the present invention is the provision of a new and improved camera lucida device having provision for substantially complete elimination of parallax between the virtual image of the subject being viewed and the reproduction surface upon which the subject's likeness is to be transferred.

A still further object is to provide a wide angle camera lucida device which is substantially free from coma, astigmatism, distortion and field curvature, having provision for varying the size of the image viewed and for eliminating parallax over the entire visual field between the image and a planar reproduction surface.

Another object of this invention is to provide a new and improved slide viewer which is substantially free from coma, astigmatism, distortion and field curvature.

Still another object is the provision of a new and improved slide viewer capable of presenting the slide to the viewer in true perspective.

A still further object of the present invention is the provision of a new and improved wide angle slide viewer capable of variable magnification and perspective control.

Yet another object is to provide a relatively economical, easy to use, slide viewer having a wide visual field which is essentially free from distortion, field curvature and off-axis aberrations.

Still another object of this invention is to provide a new and improved optical viewing device capable of being selectively utilized as either a camera lucida or a film transparency viewer.

The above and other objects and advantages of this invention will become apparent from the following description, when taken in conjunction with the accompanying drawings of illustrative embodiments thereof, and wherein.

Figure 1:
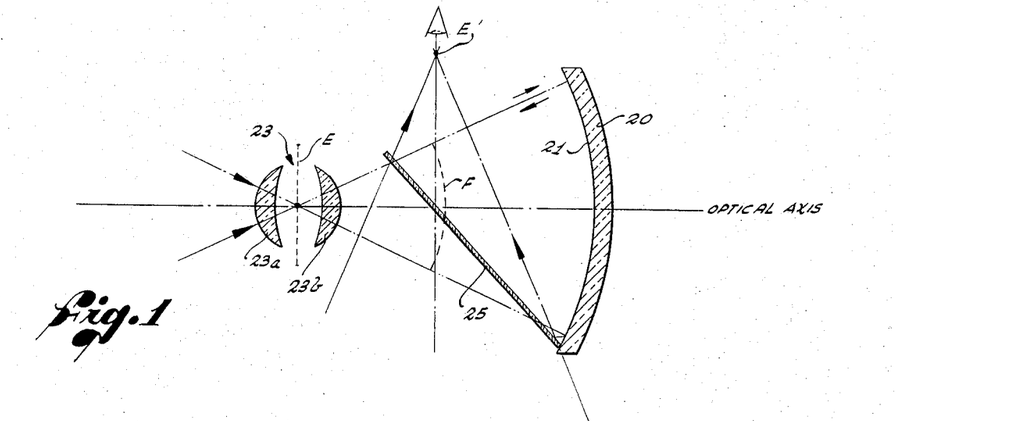
FIG. 1 is an optical schematic diagram of one embodiment of an optical viewing apparatus constructed in accordance with the present invention.

Referring now to the drawings, and particularly to FIG. 1 thereof, an optical system in accordance with the invention includes a mirror 20 providing a substantially spherical concave reflecting surface 21, a positive lens system 23 with its optical axis in coincidence with the optical axis of the mirror 20, and a partially light reflective, partially light transmissive beamsplitter 25 interposed between the mirror and the positive lens system. The beamsplitter 25 typically comprises a pellicle, or a thin glass plate with a partial reflecting-transmitting film evaporated onto the surface facing the mirror 20. While the beamsplitter 25 is shown inclined at an angle of substantially 45 degrees to the common optical axis of the mirror 20 and lens system 23, and intersects the focal surface F of the mirror in a presently preferred embodiment of the invention, it is to be understood that the beamsplitter may be inclined at angles other than 45 degrees to the optical axis and located in front of or behind the mirror focal surface without departing from the spirit and scope of the present invention.

Moreover, while the reflecting surface 21 has been described as substantially spherical, this is applied only in the general sense and is deemed to include aspherical skill-of-the-art variations from an ideal spherical surface in order to optimize optical performance.

The positive lens system 23 is shown, by way of example, as comprising a pair of meniscus lens elements 23a, 23b. However, the lens system 23 may, in practice, consist of a single positive lens or any combination of lenses making up a positive lens system.

In accordance with the present invention, the exit pupil E of the lens system 23 is located as close as possible to, and preferably in coincidence with, the center of curvature of the concave reflecting surface 21. In addition, the lens system 23 has a curved field with a field curvature radius which matches the field curvature radius of the reflecting surface 21 as closely as possible. Since the field curvature radius of a spherical concave reflector is classically equal to one-half of the radius of curvature of the concave reflecting surface, the field curvature radius of the lens system 23 should closely approximate this value.

Assuming a distant object to the left of the lens system 23 in FIG. 1, the light from the object passes through the lens system 23 and forms a real image at the focal surface F of the lens system. However, the surface F is also the focal surface of the concave reflecting surface 21, the surface F being located along the optical axis a distance from the surface 21 equal to one-half the radius of curvature of the surface 21. Moreover, since the field curvature radius is the same for both the reflecting surface 21 and the lens system 23, the coincidence of the two focal surfaces at F ensures that all image rays reflected from the concave mirror surface 21 are uniformly in focus over the entire field of view, when the image is observed by light reflected from the beamsplitter 25 to the exit pupil image at E' produced by the concave mirror surface 21.

The aforedescribed elimination of curvature of field is generally extremely difficult and expensive to achieve in conventional wide angle viewing systems. In this connection, the elimination of field curvature is of particular significance in the application of the invention to camera lucida devices since, as previously indicated, "parallactic image shift" cannot be completely avoided if curvature of field is present.

Concurrently with viewing the virtual image produced by the concave mirror 20 and reflected from the beamsplitter 25, the eye of the observer at E' also views the easel (not shown) or other reproduction surface below the optical system by light transmitted from the latter surface through the beamsplitter.

By allowing imaging rays to encounter the beamsplitter 25 twice between the lens system 23 and the observer's eye, and by locating the beamsplitter between the center of curvature of the reflecting surface 21 and the reflecting surface itself, a wide visual field with an output exit pupil a comfortable distance from adjacent optics is facilitated. In addition, by locating the beamsplitter 25 so that the principal focal surface of the mirror 20 intersects some cross section of the beamsplitter, vignetting due to the beamsplitter acting as a field stop is effectively minimized.

The concave reflecting surface 21 in the optical system of FIG. 1 has virtually no chromatic aberration of its own and is essentially free from coma, astigmatism and distortion. As previously indicated, the field curvature of the mirror is minimized by using the mirror with a lens system having a field curvature radius essentially matching that of the mirror. Spherical aberration is relatively small and may be further minimized by having a relatively small aperture stop.

In order to fully utilize the very favorable, low aberration characteristics of the concave mirror 20 in the overall optical system, the aberration residuals of the lens system 23 should preferably be held to relatively low levels.

Figures 2, 3, 4:
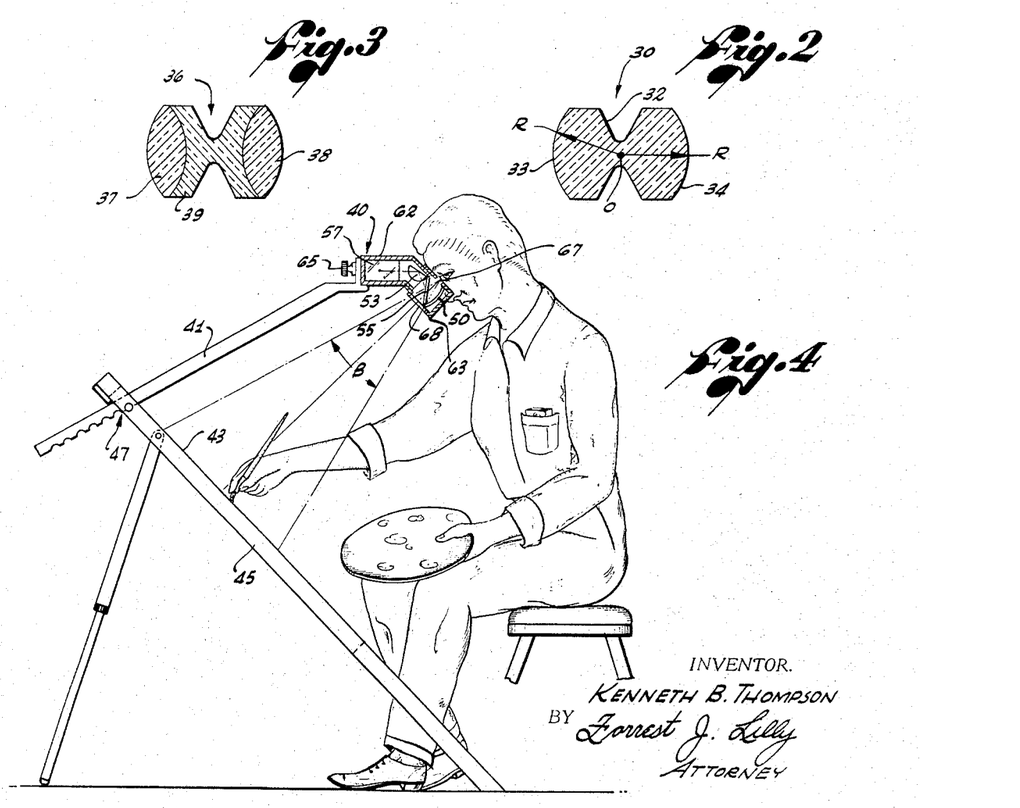
FIG. 2 is a sectional view of one type of lens suitable for use in the optical viewing apparatus of the present invention.
FIG. 3 is a sectional view of a modified construction of a lens similar to that shown in FIG. 2.
FIG. 4 is an elevational view, partially in section, of a camera lucida device for "real life" subjects, in accordance with the invention.

Referring now more particularly to FIG. 2 of the drawings, there is shown a lens 30 which is particularly well suited for use as the positive lens in a wide angle optical viewing system of the type shown in FIG. 1. Essentially, the lens 30 is fabricated from a solid glass sphere with a groove 32 cut into the sphere periphery to provide an aperture stop of the desired diameter. The radii of curvature of the two outer lens surfaces, i.e., the entrance and exit faces 33, 34, respectively, are identical and are equal to the radius of the sphere from which the lens is formed. This is similar to the well-known Coddington lens. It can readily be shown that the aperture stop and exit pupil of the lens 30 both coincide with each other at the center 0 of the lens. In this connection, reference is made to the standard optical formula relating object and image distances:

$$\frac{N}{S} + \frac{N'}{S'} = \frac{N-N'}{R} \quad (1)$$

where:
N is the index of refraction of the lens medium;
N' is the index of refraction of the outside medium;
S is the object distance;
S' is the image distance; and
R is the radius of curvature of the image forming surface.

Since the exit pupil of the lens 30 is the image of the aperture stop formed by the optics between the aperture stop and the exit face of the lens, the exit pupil in FIG. 2 is the image of the aperture stop formed by the optics between the center 0 of the lens and the exit face 34 of the lens. Since the aperture stop is located at the center of curvature of the lens 30, $$S = R \quad (2)$$

Substitution of Equation 2 into Equation 1 yields:

$$S' = -R \quad (3)$$

Therefore, the object and image distances are equal, and a virtual image of the aperture stop (the exit pupil) is located at the center 0 of the lens.

In utilizing the lens 30 of FIG. 2 in the system of FIG. 1, the center 0 of the lens 30, and hence the exit pupil of the lens, is located at the center of curvature of the concave reflecting surface 21. In this way, concentricity is preserved for all of the optical power elements, i.e., lens and concave mirrow reflecting surfaces, in the overall optical system. The effect of this is that all aberrations are virtually eliminated with the exception of spherical aberration and longitudinal chromatic aberration, with even the latter two aberrations being relatively small. In this connection, spherical aberration is usually the least significant aberration considered in the design of eyepieces, and longitudinal chromatic aberration is of relatively little concern to overall system performance where a short focal length lens, such as that involved in the present invention, is being utilized. The correction of lateral chromatic aberration is of much greater significance than longitudinal chromatic aberration.

FIG. 3 illustrates a cemented triplet lens 36, similar to the lens 30 shown in FIG. 2, which is also corrected for longitudinal chromatic aberration. Essentially, the lens 36 consists of a pair of outer elements 37, 38 and an inner element 39. The radius of curvature of the outer surface of each of the lens elements 37, 38 is the same and these surfaces have a common center of curvature at the center of the lens. All three of the lens elements 37, 38, 39 have the same index of refraction. However, the outer lens elements 37, 38 are of high v-number glass, while the center element 39 is of low v-number material. By selection of appropriate inner curves for the contact interfaces between the outer lens elements 37, 38 and the center lens element 39, longitudinal chromatic aberration can be effectively minimized.

By use of the concentric principle, in the lens itself and in the overall system, by locating the lens exit pupil substantially in coincidence with the center of curvature of the concave reflecting surface, by using a wide angle lens and concave mirrow having essentially matching field curvature radii, and by locating the real image formed by the lens within the beamsplitter, a wide angle viewing system is provided with virtually complete absence of off-axis aberrations, minimal curvature of field and low distortion. Hence, the image quality over all parts of the wide angle field is uniformly high and essentially equal to that found at the center of the visual field.

FIG. 4 illustrates the invention in its application as a camera lucida for real life subjects. A camera lucida 40 is mounted in any appropriate manner to one end of a supporting extension arm 41 which is adapted to control the distance between the lucida device and the reproduction surface 43 of an easel 45. While the extension arm 41 is illustrated as incorporating a slot and pin arrangement at 47 for varying the position of the arm with respect to the easel surface 43, it is to be understood that this is by way of example only, and any appropriate means for varying the distance between the lucida 40 and the easel surface may be employed.

Figure 5:
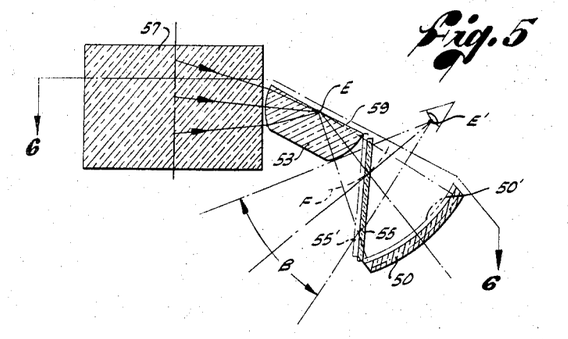
FIG. 5 is an enlarged, elevational view in section of the camera lucida optics shown in FIG. 4.
Figures 6, 8, 9:
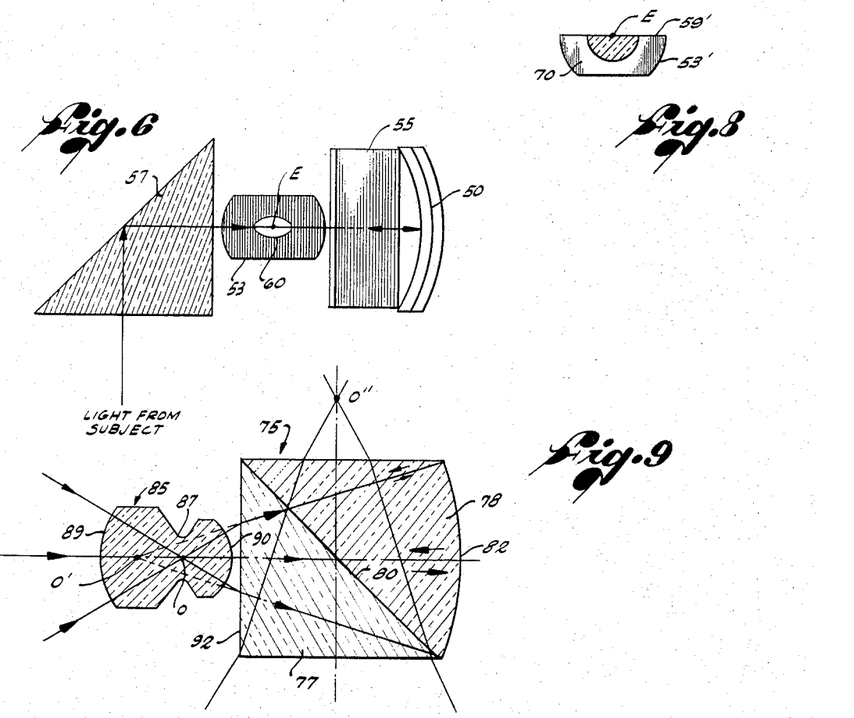
FIG. 6 is an additional view of the camera lucida optics, taken along the line 6—6 in FIG. 5.
FIG. 8 is a sectional view, taken along the line 8—8 in FIG. 7, through the center of the lens element.
FIG. 9 is an optical schematic diagram illustrating another embodiment of an optical viewing apparatus in accordance with the invention.

The optical system for the camera lucida 40 is best observed in FIGS. 5 and 6 and is basically the same in concept as that shown in FIG. 1. The concave mirror 50, lens 53 and beamsplitter 55 in FIGS. 4–6 correspond to the mirror 20, lens system 23 and beamsplitter 25 in the system of FIG. 1. The focal surface of the lens 53 coincides with the focal surface of the concave mirror 50 at F. However, the lens 53 is a combined lens-prism, since it is used as a reflector as well as a lens.

In addition, a right-angle prism 57 is added between the lens 53 and the subject being viewed. The reason for using the prism 57 and the lens-prism 53 is because of the desire to provide an image of the subject upon the reproduction surface 43 which is erect and not reverted. Since the use of a lens alone would normally produce both inversion and reversion, and since most real life subjects cannot be manipulated to compensate for this inherent optical phenomenon, a pair of reflections are necessary to provide the desired corrections. In this connection, the first reflection takes places within the prism 57 and corrects for the subsequent reversion produced by the lens 53, whereas the reflection which takes place within the lens-prism 53 itself corrects for the image inversion due to the lens. As a result, a naturally oriented image of the subject being viewed is observed upon the easel surface 43.

The lens-prism 53 is a polished hemisphere having a plane surface 59 passing through the common center of curvature of the lens sphere and of the concave mirror 50. In this connection, the lens 53 is the equivalent of the lens 30 shown in FIG. 2 and is based upon the same principle of concentricity. Therefore, the aperture stop and exit pupil of the lens 53 both coincide with the center of curvature at E.

The exit pupil of the entire optical system, i.e., the image of the exit pupil E produced by the concave mirror 50, is located at E'. Since the exit pupil E is located at the center of curvature of the mirror 50, this is an object distance equal to twice the focal length of the mirror. Hence, the image distance is equal to the object distance, and the exit pupil E' is produced with unit magnification at a distance from the concave mirror equal to the radius of curvature of the latter. For this reason, the focal length of the concave mirror can be selected to provide an overall system with almost any desired eye relief, since the location of the output exit pupil E′ is a function of the mirror focal length.

The aperture stop of the lens-prism 53 is an elliptical area 60 (FIG. 6) upon the plane surface 59, the projected area presented to the concave mirror 50 and light from the subject reflected from the prism 57 in FIG. 5 being a circle rather than an ellipse. All reflection by the plane surface 59 is confined to the elliptical area 60. One manner of accomplishing this is by coating the area of the plane 59 outside of the ellipse 60 with a light absorbing material, such as black paint or the like. The latter is illustrated in FIG. 6.

Referring now again to FIGS. 4 and 5, light from the subject enters the prism 57 in a direction normal to the plane of the drawing and is reflected into the lens-prism 53. The light is then reflected from the elliptical aperture stop zone 60 through the exit face of the lens 53, and through the beamsplitter 55 to the mirror 50. Since the image produced by the lens 53 coincides with the focal surface F of the mirror 50, the mirror acts as a collimator to reflect parallel bundles of light about each principal ray back to the beamsplitter 55 and then to the exit pupil of the system at E′. It will be apparent that, by virtue of the double reflection in the prism 57 and lens-prism 53, the image observed by the eye at E′ is erect and in correct right-to-left relationship.

The eye of the observer at the system exit pupil E′ in FIG. 5 views the vertical dimension of the easel surface 43 (FIG. 4) through the beamsplitter 55 as angle $\beta$. In this connection, the components of the system shown in FIG. 5 can be readily arranged to provide a vertical field of at least 40 degrees.

As previously indicated, the image produced by the lens 53 coincides with the focal surface F of the concave mirror 50. Hence, the image observed by the eye at E′ is located at infinity. However, since the easel surface 43 is a finite distance from the observer's eye, parallactic image shift will prevail over the entire visual field unless the image plane is brought into registry with the plane of the easel reproduction surface. Hence, the image forming rays from the subject cannot enter the eye at E′ collimated, but must converge to precisely locate the virtual image plane at the easel. This is accomplished by moving the mirror 50, or alternatively the mirror and beamsplitter 55 as a unit, to the phantom position 50′, 55′, respectively, shown in FIG. 5. The amount of focal shift of the mirror 50 necessary to accomplish such registration is generally extremely small and would be of the order of $\frac{1}{10}$ of an inch for a one-inch focal length mirror and an exit pupil to easel distance of approximately 15 inches. The significance of the complete correction for field curvature becomes apparent at this point, since parallax could never be completely eliminated if field curvature were present.

Referring now again to FIG. 4, the optical system of the camera lucida 40 is housed in two units 62, 63 which are detachable from one another. The prism 57 and lens-prism 53 are mounted in the unit 62 which is attached in any appropriate manner, as by a thumbscrew 65, to the extension arm 41. The housing 63 contains the concave mirror 50 and beamsplitter 55. If desired, the beamsplitter 55 may be included in the housing 62 rather than in the housing 63. The unit 63 is moved relative to the unit 62 in any appropriate manner, as by a conventional rack and pinion focusing arrangement.

The unit 63 is provided with a small opening 67 to permit viewing of the virtual image formed by the optical system and to also permit viewing of the easel surface 43 through a larger aperture 68 on the opposite side of the unit 63.

If it is desired to alter the size of the virtual image observed on the easel surface 43, the extension arm 41 is adjusted to vary the distance between the easel surface 43 and the exit pupil E′ of the camera lucida 40. Moving the lucida 40 closer to the easel surface results in an image of diminished size, whereas moving the lucida farther away from the easel surface increases the size of the observed image. After the extension arm 41 has been properly positioned to establish the proper exit pupil to easel distance, the unit 63 is moved relative to the unit 62 to reposition the concave mirror 50 so that the plane of the virtual image coincides with the plane of the easel surface 43 to eliminate parallax.

Although the wide angle viewing system of the present invention results in a light loss of at least 75% due to the double encounter with the beamsplitter before reaching the eye of the observer at E′, this would seldom present any practical problems with the camera lucida arrangement of FIG. 4. If the observed image appears too dim on an overly bright easel surface, it would generally be a simple matter to shade the easel surface and enhance the relative brightness of the observed image. On the other hand, if the image observed is too bright, a neutral density filter (not shown) can be installed anywhere in the optical system before the beamsplitter 55, e.g., between the prism 57 and the lens-prism 53.

Figure 7:
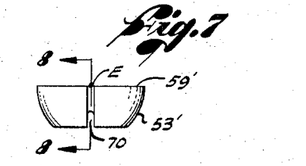
FIG. 7 is an elevational view of an alternate embodiment of the lens element shown in the optical system of FIGS. 4–6.

FIGS. 7 and 8 illustrate a lens-prism 53′ which is an alternate embodiment of the lens-prism 53 shown in FIGS. 4–6. In the embodiment shown in FIGS. 7 and 8, the aperture stop of the lens is provided by milling or otherwise forming a hemi-circular groove 70 in the outer periphery of the lens with the center of the groove radius at the optical center E of the lens in plane 59′. By locating the center of the groove radius at E, the image of the groove 70 in the plane reflecting surface 59′ of the hemispherical lens element 53′ effectively provides the circular aperture stop required.

Referring now to FIG. 9, an embodiment of the invention utilizing a solid beamsplitter cube 75 is illustrated. The beamsplitter cube 75 is substituted, however, not only for the beamsplitter but also for the concave mirror of the system shown in FIG. 1. The beamsplitter cube 75 is formed by a pair of prisms 77, 78 cemented together to form a common interface 80. A partial reflecting-transmitting film is evaporated onto one of the prism faces at 80 prior to cementing the two prisms together. The beamsplitter function is thus performed at the interface 80. The outer surface 82 of the prism 78 provides the necessary concave reflecting surface directed towards a lens 85.

The lens 85 is a positive lens having the usual aperture groove 87. The lens surfaces 89, 90 have concentric but unequal radii about the aperture stop 87 at point 0. Hence, the exit pupil and aperture stop of the lens 85 coincide at 0. However, it will be noted that the reflecting surface 82 is now a second surface mirror rather than a first surface mirror as in the system shown in FIG. 1. Use of the beamsplitter cube 75 presents the plano entrance face of the prism 77 as the first face encountered by light entering the beamsplitter cube from the lens 85.

As a result, the exit pupil with which the center of curvature of the reflecting surface 82 must coincide is not the exit pupil of the lens 85 at 0, but rather the exit pupil of all of the preceding optics including the beamsplitter cube 75. Hence, the center of curvature of the concave reflecting surface 82 coincides with 0′, which is the virtual image of the aperture stop 87 after refraction at the plano entrance face 92 of the prism 77. Hence, the mirror is concentric with the virtual image of the aperture stop after the light beam has entered the prism. In this connection, if the index of refraction of the beamsplitter cube 75 is N, then the distance of the exit pupil 0′ from the entrance face 92 of the beamsplitter cube is N-times the distance that the exit pupil 0 of the lens 85 is away from the entrance face of the beamsplitter cube. The exit pupil of the entire optical system, i.e., the image of 0′ formed by the concave reflecting surface 82, is located at 0″.

Since the principal light rays, upon entering the plano entrance face 92 of the prism 77 are afflicted with spherical aberration, some distortion may prevail in the embodiment of the invention shown in FIG. 9. However, the amount of distortion introduced is generally acceptable for most applications, and this distortion can be further reduced by aspherizing the concave reflecting surface 82.

The use of an optical medium which is denser than air on each side of the beamsplitter, as shown in the embodiment of the invention illustrated in FIG. 9, constricts the cone of principal rays into a narrow angle, and thereby enables the optical system to provide the eye of the observer at 0" with a wider field of view. The use of a beamsplitter cube also eliminates the requirement of making the beamsplitter substrate thin in order to minimize parallel plate aberrations occurring from a divergent beam passing through such a plate at other than normal incidence.

In discussing the aforedescribed embodiments of the invention, it has been assumed that the subject being viewed is at a considerable distance from the viewing apparatus, i.e., an optical situation closely approaching infinite object distance, so that the real image formed by the positive lens is located substantially at the principal focus of the lens system. While this condition usually holds true for a camera lucida where the subject is real life, it does not hold true where the subject being viewed is a film transparency located mere inches away from the lens system. Therefore, certain compromises must be made in the application of the invention as a slide viewer in order to obtain a wide visual field substantially free from distortion, curvature of field and off-axis aberrations.

Figure 10:
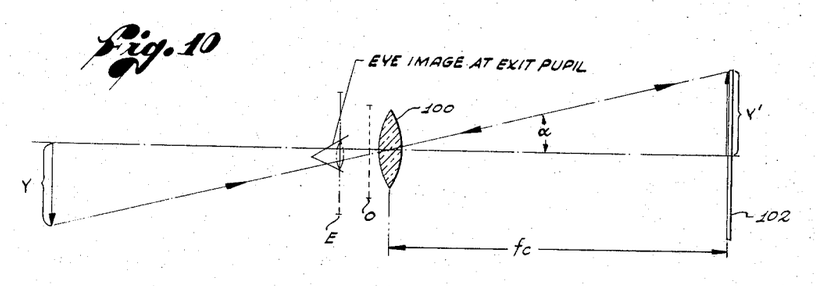
FIGS. 10 and 11 are optical schematic diagrams for the purpose of illustrating the theory of operation and manner of selection of optical component values for a typical optical viewing apparatus constructed in accordance with the present invention.

In addition, in order to view the subject matter of a slide in true perspective, the corresponding angular values observed by the original camera lens must be faithfully reproduced by the lens system of the viewing device. FIG. 10 illustrates this perspective concept. Light from a distant object Y is focused by a camera lens 100 to form an image Y' upon a film 102. Since the object distance is of great magnitude compared to the focal length $f_c$ of the lens 100, the image distance behind the lens 100 is essentially $f_c$. Hence, $$f_c = Y'/\tan \alpha \qquad (4)$$

Ideally, when the image Y' is subsequently observed in a slide viewer, the eye of the observer should view the image at the same angle $\alpha$ in order to see the original subject Y in true perspective. Therefore, assuming FIG. 10 to now represent the optics of an ideal slide viewer, the viewing lens 100 would have a focal length equal to the original camera lens, and the eye of the observer would be located at the exit pupil E (the image of the aperture stop 0 formed by the lens 100). The aforedescribed conditions for true perspective in a slide viewing device can be easily accomplished with the wide angle viewing apparatus of the present invention.

Figure 11:
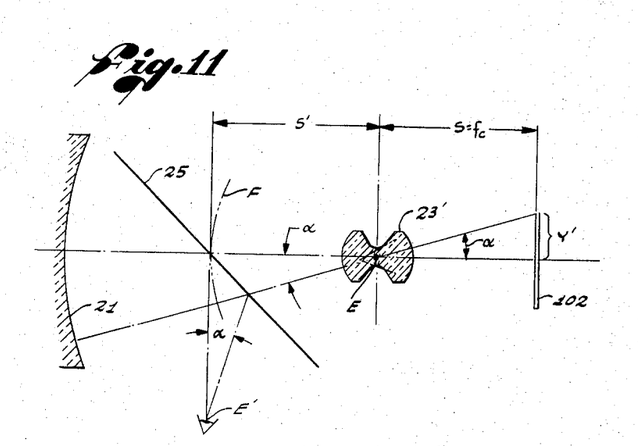

Referring to FIG. 11, the concave reflecting surface 21, positive lens 23' and beamsplitter 25 correspond to like elements 21, 23 and 25 respectively, in the system of FIG. 1. However, the slide 102 now provides a subject for the lens 23' at a relatively small finite distance from the lens.

The concave reflecting surface 21 effectively images the pupil of the observer's eye E' at the exit pupil E of the lens 23' between the beamsplitter 25 and the slide 102. In this imagery, the magnification is unity, since both the object and image distances from the concave surface 21 are the same and are equal to the radius of curvature or twice the focal length of the reflecting surface 21. Hence, the observer's eye is effectively embedded within the lens 23' which is used to transfer the slide image to the focal plane of the concave mirror. As a result, the observer's eye effectively views the image Y' with the same angular values observed by the lens 23' itself. Therefore, the geometry of FIG. 10 applies and the true perspective of the image Y' can be preserved by making the object distance S of the slide from the lens 23' equal to the focal length $f_c$ of the original camera lens used to produce the image Y' upon the slide 102. Hence, Equation 4 now becomes:

$$S = f_c = Y'/\tan \alpha \qquad (5)$$

If the observer is to view a collimated image of the slide 102, the image of the slide formed by the lens 23' must coincide with the principal focus F of the concave reflecting surface 21. This means that the image distance S' must be equal to the focal length of the concave mirror.

The focal length of the concave reflecting surface 21 is arbitrary insofar as field angle is concerned, since the mirror is always working at unit magnification between the exit pupil of the lens and the observer's eye. The considerations that dictate the focal length of the concave mirror concern mirror size and eye relief. A typical concave mirror focal length, by way of example, is 1.150 inches. Hence, the radius of curvature of the reflecting surface 21 in FIG. 11 would be 2.300 inches.

The manner in which the focal length of the lens 23' is computed is next described. It has been determined empirically in one embodiment of the invention that, with the beamsplitter 25 inclined at an angle of 45 degrees to the optical axis of the lens and concave mirror, a vertical field of approximately 40 degrees can be obtained. Therefore, the angle $\alpha$ in FIG. 11 is 20 degrees in the particular example described. Assuming a standard 35 mm. slide format (24 x 36 mm.), Y' equals 12 mm. Hence, substitution of known values into Equation 5 yields:

$$S = 32.97 \text{ mm.} = 1.298 \text{ inches} \qquad (6)$$

Hence, a slide photographed with a 33 mm. camera lens would be viewed in true perspective by an observer at E' in FIG. 11 if the slide is located 1.298 inches from the lens 23'. Since the image distance S' must equal the focal length of the concave reflecting surface 21 in order to locate the exit pupil of the lens at the center of curvature of the surface 21, S' is 1.150 inches.

The standard lens formula for computing the focal length of the lens 23' is:

$$1/f_v = 1/S + 1/S' \qquad (7)$$

where $f_v$ is the focal length of the viewer lens 23'.

Substituting known values for the object and image distances S and S', respectively, yields:

$$\frac{1}{f_v} = \frac{1}{1.298} + \frac{1}{1.150}$$

and $$f_v = 0.610 \text{ inch} \qquad (8)$$

The magnification is given by:

$$M = \frac{S'}{S} = \frac{1.150}{1.298} = 0.886 \qquad (9)$$

Equation 9 represents the high magnification condition for the slide viewer. For low magnification, it is arbitrarily established for the particular design herein described that the 36 mm. long dimension of the slide 102 subtend an angle at the eye of 20 degrees. In other words, the horizontal field of the slide viewer subtends a 40 degree angle.

Using the aforedescribed equations, it may readily be shown that the new object distance S is 1.98 inches, and the new image distance S' is 0.88 inch. Hence, the exit pupil of the lens 23' can no longer be exactly concentric with the concave reflecting surface 21, but must instead lie approximately 0.26 inch closer to the mirror than the center of curvature of the mirror. However, the latter variation in lens position from ideal conditions does not affect image quality substantially, since the visual field angle is considerably smaller at this low magnification. Substitution of values for the low magnification condition into Equation 9 yields a magnification of 0.456.

The radius of curvature of the sphere from which the lens 23' is formed is readily determined from standard optical formulas once the focal length of the lens is known.

The standard expression for reciprocal focal length as a function of radii of curvature and index of refraction in a lens bounded by air is $$\frac{1}{f} = (N-1)\left(\frac{1}{R_1} + \frac{1}{R_2} - \frac{T(N-1)}{NR_1R_2}\right) \quad (10)$$

where
$f$ = the focal length of the lens
$R_1$, $R_2$ are the radii of curvature of the outer lens surfaces
$N$ is the index of refraction of the lens medium, and
$T$ is the axial thickness of the lens For the lens 23' which is the same type of lens shown in FIG. 2, $R_1 = R_2 = R$ which is the radius of the sphere, and $$T = R_1 + R_2 = 2R$$

Substitution of these values for $R_1$, $R_2$ and $T$ into Equation 10 yields:

$$R = 2f\frac{(N-1)}{N} \quad (11)$$

Hence, with the focal length of the lens 23' known, the radius of curvature of the sphere can be readily determined for any particular lens medium.

Figure 12:
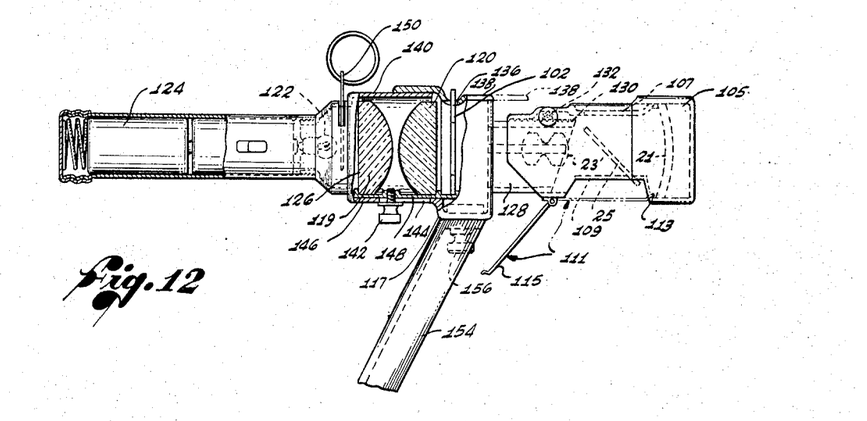
FIG. 12 is an elevational view, partially in section, illustrating a combined camera lucida and slide viewing apparatus in accordance with the invention.
Figure 13:
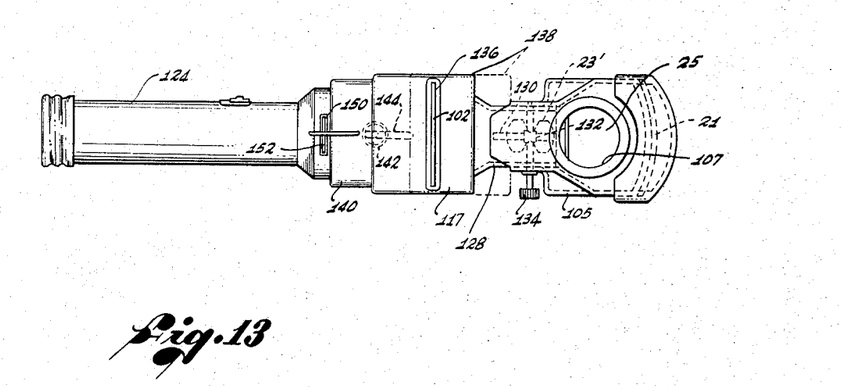
FIG. 13 is a top plan view of the apparatus shown in FIG. 12.

Referring now more particularly to FIGS. 12 and 13, there is shown a specific embodiment of a wide angle viewing apparatus in accordance with the present invention which uses a slide 102 as the subject and which may be selectively utilized as either a camera lucida or a slide viewer.

The optical system for the apparatus shown in FIGS. 12 and 13 essentially duplicates that schematically illustrated in FIG. 11 and comprises the concave mirror 21, the positive lens 23', and the partial reflecting-transmitting beamsplitter 25 at an angle of 45 degrees to the common optical axis of the lens and the mirror.

The mirror 21 and beamsplitter 25 are mounted in any appropriate manner within a hollow housing 105 fabricated of any suitable material, such as metal, wood, plastic and the like. The upper viewing side of the housing 105 is provided with a recessed circular aperture 107 for the eye of an observer (not shown). The opposite side of the housing 105 is provided with a rectangular opening 109 of sufficient size to provide adequate clearance for both the vertical and horizontal field of the optical system.

A hinged shield 111 is pivotally mounted upon the lower side of the housing 105 adjacent the opening 109, and this shield provides the means for selectively converting the instrument from use as a camera lucida device to use as a film transparency viewer. In this connection, with the shield 111 in the solid position shown in FIG. 12, the aperture 109 is exposed to enable the observer to view the reproduction surface of an easel, such as the surface 43 in FIG. 4. On the other hand, when the shield 111 is pivoted to the phantom position and latched at 113, the easel is cut off from view, and only the virtual image of the slide 102 can be seen by an observer peering through the aperture 107. In this regard, the inside face 115 of the shield 111, facing the beamsplitter 25 in the latched position, is preferably coated with a light absorbing material to minimize reflection from this surface when the instrument is used as a slide viewer.

The lens 23' is supported within a second hollow housing 117 which also contains the slide 102 and a pair of condenser lenses 119, 120 of molded plastic or the like. A light source, in the form of a frosted incandescent lamp 122 at the leading end of a battery case 124, is in threaded engagement with the housing 117 to provide illumination for the slide 102. If the lamp 122 is not frosted, then the first surface 126 of the condenser lens 119 must be diffused in order to provide a diffused source of illumination whose image at the midpoint of the lens 23' completely fills the aperture stop.

It will be appreciated, of course, that a battery powered illumination source is illustrated solely by way of example, and any other source of power, e.g., 110 volts A.C., may be used to supply electrical power to an appropriate lamp 122. In addition, a rheostat device (not shown) may be included in the power supply if it is desired to electrically control the intensity of the light output from the lamp 122.

The lens 23' is supported in a fixed position within the leading end 128 of the housing 117. This leading end 128 of the housing 117 mates in sliding engagement with the housing 105. In this connection, translational movement of the housing 105 relative to the housing 117, to change the relative position of the mirror 21 with respect to the lens 23' during focusing of the virtual image of the slide 102, is effected by means of a conventional rack and pinion drive 130, 132. The rack 130 is carried upon the housing 117, whereas the pinion gear 132 is mounted for rotation within the housing 105 and is manually controlled by a knob 134 at the side of the housing 105.

The slide 102 is inserted into the housing 117 through a slot 136 in the upper wall 138 of the housing 117. The slide 102 and condenser lenses 119, 120 are held within a sub-assembly housing 140 which is mounted within the main housing 117 for sliding movement along the optical axis of the system. To this end, a thumbscrew 142 extends through an elongated clearance slot 144 in the lower wall 146 of the housing 117 and into threaded engagement with the wall 148 of the sub-assembly housing 140. Hence, by loosening the thumbscrew 142, the slide 102 may be moved to any position between the low and high magnification limits indicated by the solid and phantom positions, respectively, of the housing wall 138 in FIGS. 12 and 13. Of course, each time the slide 102 is repositioned relative to the lens 23', the object and image distances are altered and the knob 134 must be rotated to refocus the optical system by moving the housing 105 and hence the mirror 21 contained therein.

In order to control image brightness, provision is made for the insertion of a neutral density filter 150 through a slot 152 in the housing 140 to attenuate the light passing from the lamp 122 to the condenser lenses 119, 120.

When the instrument shown in FIGS. 12 and 13 is to be used as a camera lucida, an extension arm 154 is connected to the wall 146 of the housing 117 in any appropriate manner, as by a thumbscrew 156. The extension arm 154 in FIG. 12 is the counterpart of the extension arm 41 in the camera lucida arrangement illustrated in FIG. 4.

If it is desired to use the instrument shown in FIGS. 12 and 13 as a slide viewer rather than as a camera lucida, the instrument is detached from the extension arm 154, shield 111 is latched in its closed position shown in phantom, and the instrument is hand held vertically by grasping the battery case 124. The slide 102 must then be rotated 180 degrees so that the observer will view an erect image.

The long vertical dimension of the instrument when used as a slide viewer also affords a considerable degree of comfort in holding the viewer. In this connection, conventional hand held viewers usually require that the arm and elbow be held upward and away from the body, a position which ultimately proves rather fatiguing. However, when the instrument of the present invention is grasped by the battery case 124 and held vertically erect, the viewer's arm is in a much lower, more comfortable position.

Figure 14:
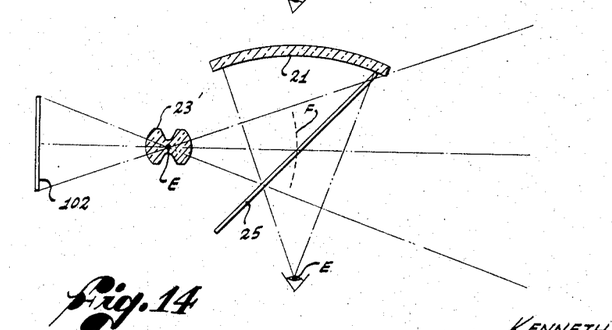
FIG. 14 is an optical schematic diagram of an alternate embodiment of the optical viewing apparatus of the present invention.

FIG. 14 illustrates an alternate arrangement of the optical system shown in FIG. 11, and like reference numerals designate like or corresponding elements in each of FIGS. 11 and 14. In the system of FIG. 14, the eye of the observer at the exit pupil E' observes the virtual image formed by the concave reflecting surface 21 by light transmitted through the beamsplitter 25, rather than by light reflected from the beamsplitter. The optical arrangement of FIG. 14 is in all respects equivalent to the optical arrangement of FIG. 11 for slide viewer purposes. However, the arrangement of FIG. 11 is preferred over that shown in FIG. 14 for camera lucida applications, since an easel viewed by the system of FIG. 14 would be observed by reflected light rather than by direct light transmission. This would revert the view of the easel and make it necessary for the artist to reverse the direction of movement of his stylus from that normally used in tracing an outline.

The optical viewing apparatus of the present invention satisfies a long existing need in the art for wide angle optical viewing devices, including camera lucidas and slide viewers, which are relatively simple in construction, compact, economical, and essentially free from distortion, curvature of field and off-axis aberrations.

It will be apparent from the foregoing that, while particular forms of the invention have been illustrated and described, various modifications can be made without departing from the spirit and scope of the invention. Accordingly, it is not intended that the invention be limited, except as by the appended claims.

I claim:
1. A camera lucida device, comprising:
   a concave, substantially spherical mirror;
   a hemispherical lens-prism having a planar reflecting face passing through the common center of curvature of the lens surface for producing a real image by refraction and reflection substantially coincident with the principal focal surface of said mirror, said lens-prism having a field curvature radius substantially equal to the field curvature radius of said mirror, the aperture stop of said lens-prism being located substantially at the center of curvature of said mirror;
   a partially reflecting, partially transmitting beamsplitter intersecting the optical axis between said lens-prism and said mirror; and
   a right angle prism for reflecting light from a subject to said lens-prism.

2. A camera lucida device as set forth in claim 1, wherein the aperture stop of said lens-prism is provided by a light absorbing coating upon all of the area of said planar reflecting surface outside of an elliptical aperture stop reflecting area, and the projection of said elliptical area along the optical axis of said mirror is a circle.

3. An optical device as set forth in claim 1, wherein the aperture stop of said lens-prism is provided by a hemicircular groove in the periphery of said lens-prism about a center upon said planar reflecting surface.

4. A camera lucida device, comprising:
   a concave, substantially spherical mirror; a hemispherical lens-prism having a planar reflecting face passing through the common center of curvature of the lens surface for producing a real image by refraction and reflection substantially coincident with the principal focal surface of said mirror, said lens-prism having a field curvature radius substantially equal to the field curvature radius of said mirror, the aperture stop of said lens-prism being located substantially at the center of curvature of said mirror;
   a partially reflecting, partially transmitting beamsplitter intersecting the principal focal surface of said mirror between said lens-prism and said mirror;
   a right angle prism for directing light from a subject by reflection to said lens-prism; and
   means for moving said concave mirror relative to said lens-prism to vary the location of the virtual image formed by said mirror.

5. A combined camera lucida and slide viewing device, comprising:
   a concave, substantially spherical mirror;
   a postive lens having an optical axis coincident with the optical axis of said mirror for producing a real image substantially coincident with the principal focal surface of said mirror, said lens having a curved field with a field curvature radius substantially equal to the field curvature radius of said mirror;
   a partially reflecting, partially transmitting beamsplitter intersecting the optical axis between said lens and said mirror;
   means for supporting a slide along the optical axis of said lens on the side of said lens directed away from said mirror;
   means for illuminating said slide;
   means for varying the distance between said slide and said lens; and
   means for varying the distance between said mirror and said lens to focus the virtual image of said slide formed by said mirror, whereby an observer can simultaneously view said virtual image by reflection from said beamsplitter and also view a reproduction surface by light transmission through said beamsplitter.

6. A combined camera lucida and slide viewing device, comprising:
   a concave, substantially spherical mirror;
   a positive lens having an optical axis coincident with the optical axis of said mirror for producing a real image substantially coincident with the principal focal surface of said mirror, said lens having a curved field with a field curvature radius substantially equal to the field curvature radius of said mirror;
   a partially reflecting, partially transmitting beamsplitter intersecting the principal focal surface of said mirror;
   means for supporting a slide along the optical axis of said lens on the side of said lens directed away from said mirror;
   means for illuminating said slide;
   means for varying the distance between said slide and said lens;
   means for varying the distance between said mirror and said lens to focus the virtual image of said slide formed by said mirror, whereby an observer can simultaneously view said virtual image by reflection from said beamsplitter and also view a reproduction surface by light transmission through said beamsplitter; and
   means at said viewing device for selectively shielding said reproduction surface from being viewed through said beamsplitter.

7. A combined camera lucida and slide viewer, comprising:
   a first housing having a pair of apertures defined in a pair of opposite walls thereof;
   a second housing;
   means for effecting translational movement of said first housing relative to said second housing along the common axis thereof;
   a concave, substantially spherical mirror supported within said first housing and facing said second housing;
   a positive lens of short focal length fixedly supported within said second housing and having an optical axis coincident with the optical axis of said mirror, said lens producing a real image substantially coincident with the principal focal surface of said mirror, said lens having a curved field with a field curvature radius substantially equal to the field curvature radius of said mirror;
   a planar, partially reflecting, partially transmitting beamsplitter supported within said first housing between said pair of apertures at an angle of substantially 45 degrees to the optical axis of said mirror, the focal surface of said mirror intersecting the plane of said beamsplitter;
   means for supporting a slide in said second housing on the side of said lens opposite that directed toward said mirror;

means for illuminating said slide; and
means for varying the spacing between said slide supporting means and said lens within said second housing.

8. Apparatus as set forth in claim 7, wherein said means for effecting translational movement of said first housing with respect to the second housing includes a rack and pinion arrangement.

9. Apparatus as set forth in claim 7, including a light shield pivotally mounted upon said first housing for selectively closing off one of said pair of apertures.

10. Apparatus as set forth in claim 7, including means for varying the intensity of slide illumination.

References Cited

UNITED STATES PATENTS

| | | | |
|---|---|---|---|
| 2,568,327 | 9/1951 | Dudley | 352—65 X |
| 2,738,702 | 3/1956 | Angenieux | 352—129 X |
| 2,801,566 | 8/1957 | Eaton. | |
| 2,923,220 | 2/1960 | Bouwers. | |
| 3,215,032 | 11/1965 | De Lang et al. | 350—27 X |

FOREIGN PATENTS 1,310,463   10/1962   France.

JULIA E. COINER, *Primary Examiner.*

NORTON ANSHER, *Examiner.*